No. 761,262. PATENTED MAY 31, 1904.
A. STUCKI.
UNDERFRAME FOR CARS.
APPLICATION FILED SEPT. 19, 1903.
NO MODEL. 5 SHEETS—SHEET 1.

WITNESSES. INVENTOR.

No. 761,262. PATENTED MAY 31, 1904.
A. STUCKI.
UNDERFRAME FOR CARS.
APPLICATION FILED SEPT. 19, 1903.
NO MODEL. 5 SHEETS—SHEET 2.

WITNESSES. INVENTOR.

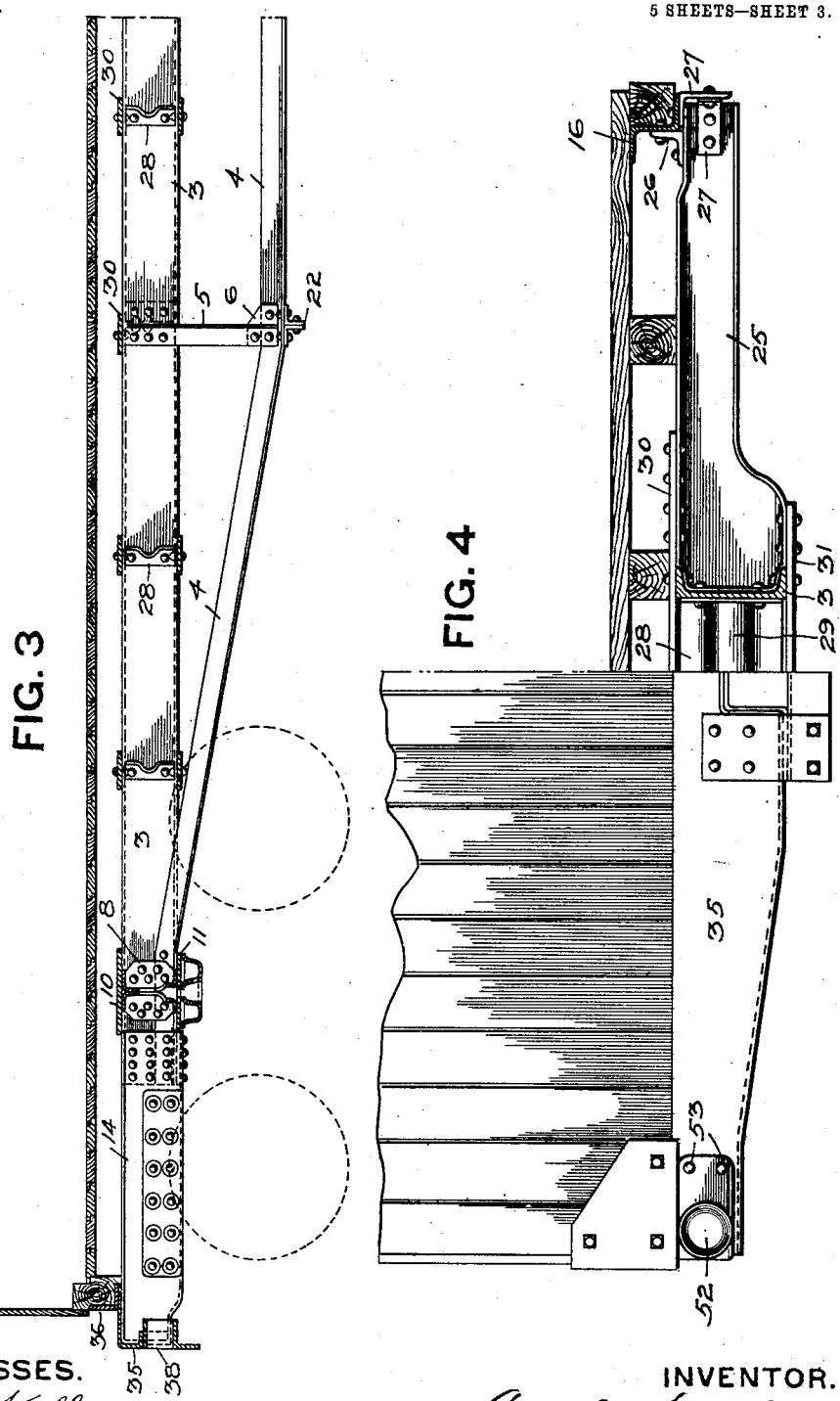

No. 761,262.
PATENTED MAY 31, 1904.
A. STUCKI.
UNDERFRAME FOR CARS.
APPLICATION FILED SEPT. 19, 1903.
NO MODEL.
5 SHEETS—SHEET 4.
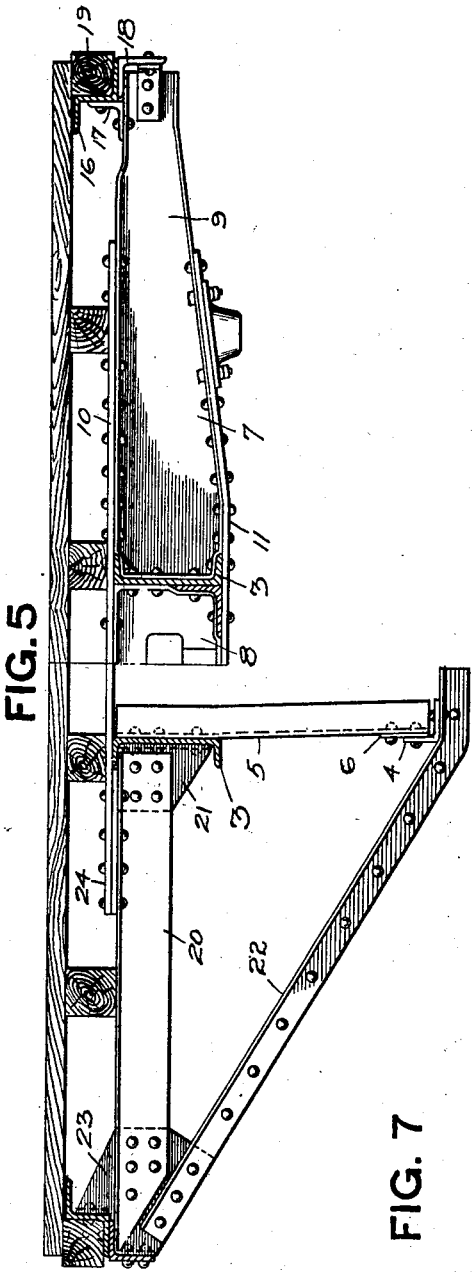
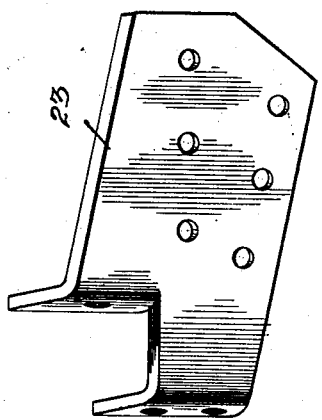
WITNESSES.
INVENTOR.

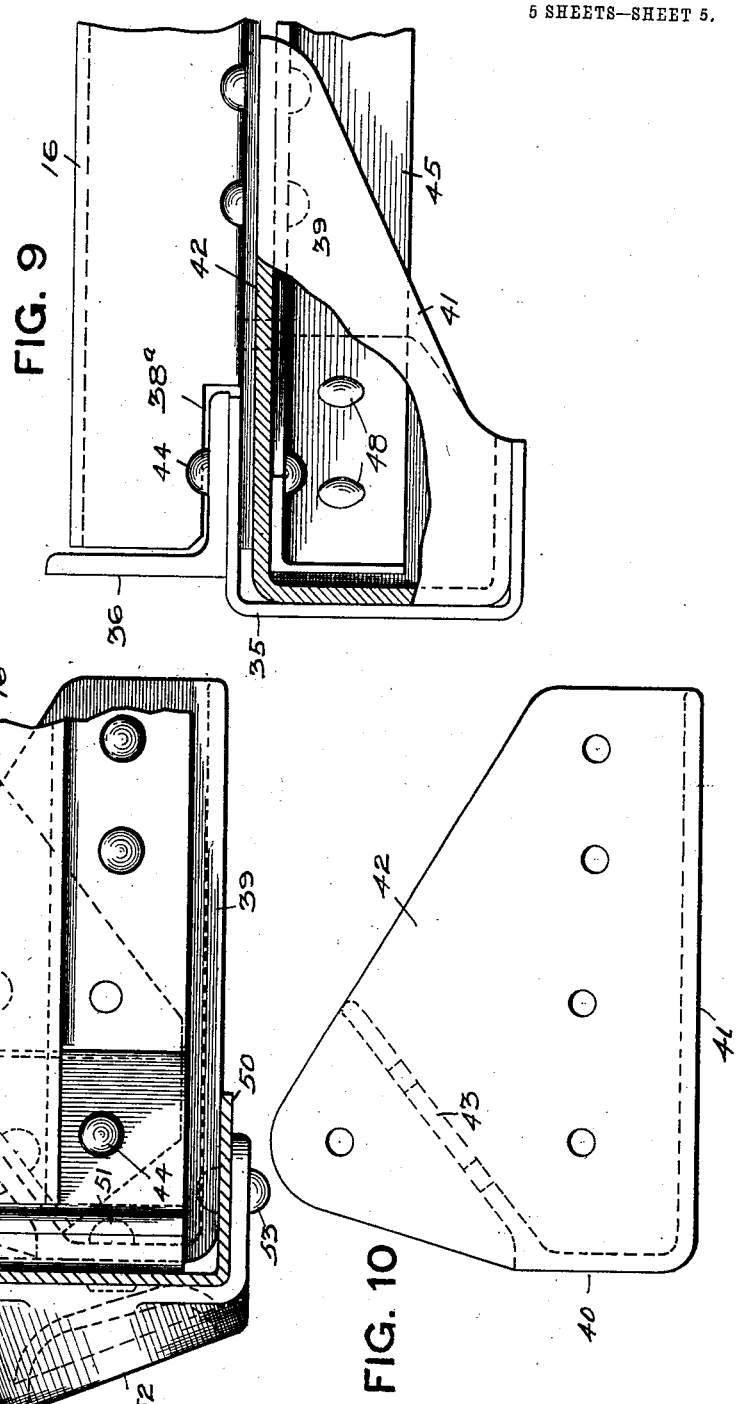

No. 761,262. Patented May 31, 1904.

UNITED STATES PATENT OFFICE.

ARNOLD STUCKI, OF ALLEGHENY, PENNSYLVANIA, ASSIGNOR TO STANDARD STEEL CAR CO., OF PITTSBURG, PENNSYLVANIA, A CORPORATION OF PENNSYLVANIA.

UNDERFRAME FOR CARS.

SPECIFICATION forming part of Letters Patent No. 761,262, dated May 31, 1904.

Application filed September 19, 1903. Serial No. 173,833. (No model.)

*To all whom it may concern:*

Be it known that I, ARNOLD STUCKI, a resident of Allegheny, in the county of Allegheny and State of Pennsylvania, have invented a new and useful Improvement in Underframes for Cars; and I do hereby declare the following to be a full, clear, and exact description thereof.

My invention relates to metallic underframes for railway-cars, and especially to that type of metallic underframes wherein the material is placed mostly in line with the end shocks and having the main longitudinal carrying members or sills placed at the center of the car, thus being directly in line with the draft-rigging in order to receive the end shocks, and having very light side sills, which are connected to the center sills by means of very deep and stiff transoms or cross-bearers, thereby transmitting the load from the car sides to the center sills, the latter carrying practically all of the load. In order to make the center sills sufficiently strong for this purpose, they are each reinforced by means of a truss member, which is separated from the main sill at its center and having its ends connected thereto.

My invention consists in improving underframes of this character by fastening the truss member to the center sills and in a novel way at the body-bolster, so as to transfer all of the stress practically to the center plate and without danger of shearing off the rivets.

The invention also consists in so positioning said truss member as to utilize to the fullest extent the strength of the metal contained therein and also in extending said truss member outwardly beyond the body-bolster to the splice of the draft-sills, thus reinforcing said splice.

The invention also consists in a novel casting for strengthening the underframe at the corners.

Figure 1:
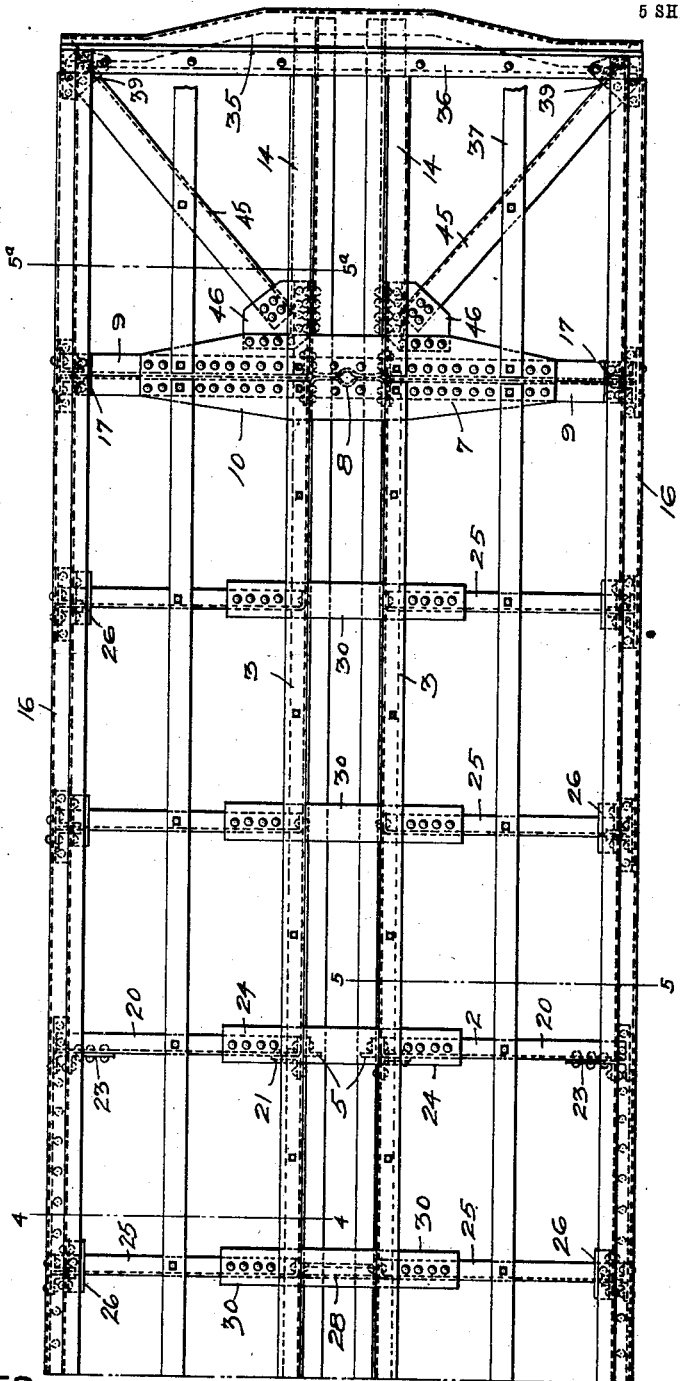
Figure 2:
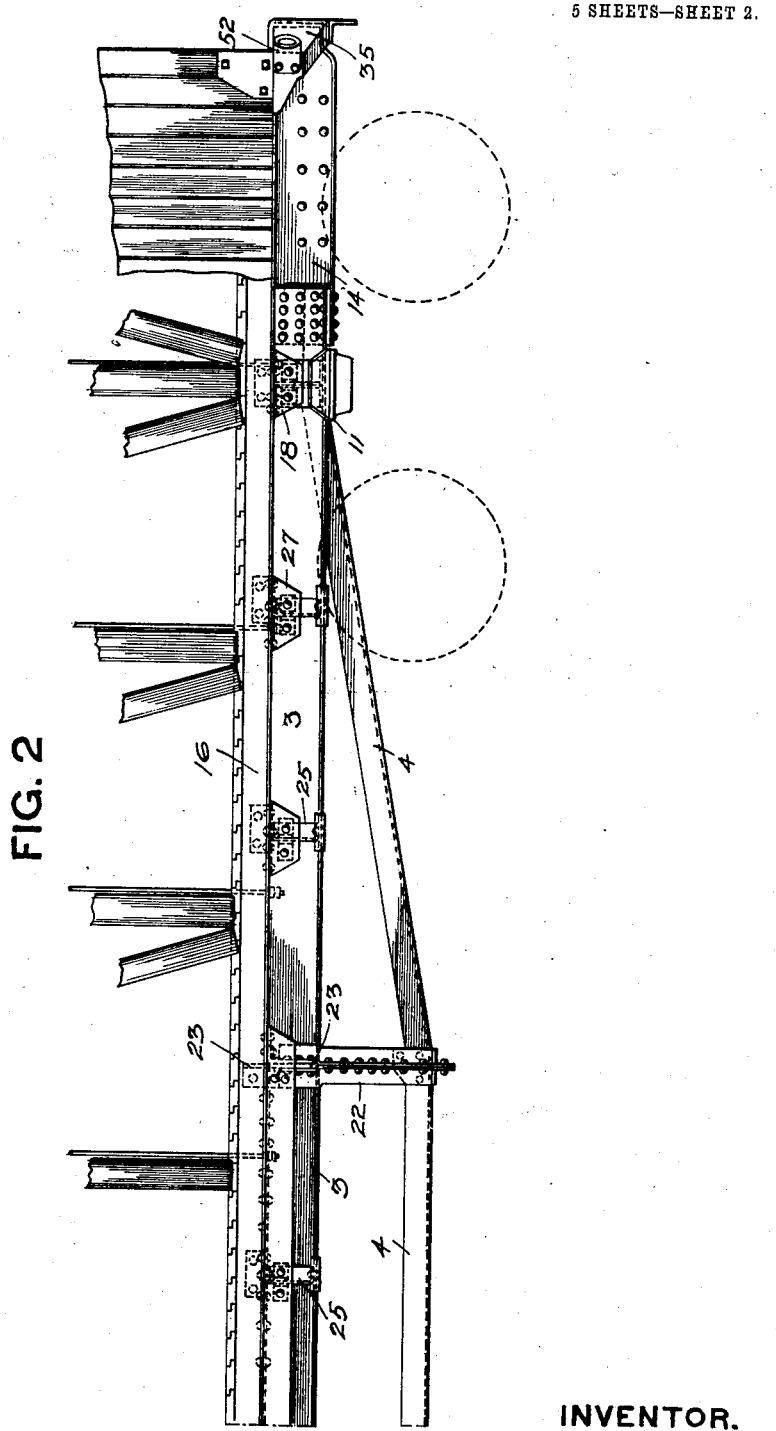

In the accompanying drawings, Figure 1 is a plan view of my underframe, the floor and superstructure being omitted. Fig. 2 is a side view of the underframe for one half of the car, showing a small portion of the superstructure. Fig. 3 is a central longitudinal vertical section of the other half of the car. Fig. 4 on its left-hand portion shows an end view of the car and on its right-hand portion shows a transverse section on the line 4 4, Fig. 1. Fig. 5 on its left-hand portion shows a transverse section on the line 5 5, Fig. 1, and on its right-hand portion a similar section on the line $5^a$ $5^a$, Fig. 1. Fig. 6 is a detail sectional view through the underframe at the center plate. Fig. 7 is a detail view of the plate connecting the transoms to the side sills, and Figs. 8, 9, and 10 are detail views of the corner-casting and portions of the end and side sills and diagonal braces.

My underframe is made entirely of metal, and comprises end sills, side sills, center sills, body-bolsters, and suitable transverse connecting means and the necessary adjuncts therefor. The underframe has been so designed as to most effectually withstand end shocks, and as a consequence the material has been placed mostly in line with the end shocks—that is, near the transverse center of the car. The center sills have been made very deep and strong, so as to act as the main carrying members of the underframe. Preferably these center sills will be formed as trusses and have been so shown in the drawings, each sill comprising a top or compression member 3, formed, preferably, of a rolled channel-beam, said beams being placed, preferably, with their flanges projecting outwardly, and a bottom or tension member 4, also formed as a flanged bar, preferably an angle-bar, such as shown, and having its ends rigidly secured to the compression member by some rigid fastening means, such as the rivets shown. The tension member is deflected downwardly at its central portion as far as possible, so as to get the maximum depth, and thus utilize the maximum strength of the material, the downward depression, however, not being such as to come too close to the track. Interposed between the compression and tension member at this deflected portion are suitable struts 5, which are shown as sections of angle-bar arranged vertically and riveted to the webs of the compression members and having their lower ends secured to the vertical legs of the tension members by means of connection-plates 6. In order to get the greatest possible benefit of the metal in the tension members 4, they are so placed that the horizontal legs of the angles are located at the bottom, thereby having as much as possible of the metal of said tension members separated as far from the compression member as is possible. This arrangement also has another benefit—namely, at the center plate—as will hereinafter be pointed out.

The body-bolster 7 is of an old construction, being composed of a suitable brace 8, placed between the center sills, and suitable web members 9, extending from the center sills to the sides of the car, these web members being shown as pressed shapes provided with flanges on their top and bottom sides and on their inner ends, the last-named flanges serving as a means of connecting them to the center sills. Extending across the top of the center sills and riveted to the upper flanges of the web members is the cover-plate 10, and extending underneath the center sills and riveted to the lower flanges of the web members 9 is a similar transverse plate 11. The center sills project slightly beyond the body-bolsters, and the draft-sills 14 are separate pieces riveted to the center sills outside of the body-bolsters, so as to facilitate repairs in case of injury. These draft-sills are shown as sections of Z-bar, having their inner ends riveted to the webs of the channel members 3 of the center sills. The tension members 4 of the center sills are bent to a horizontal position as soon as they reach the center plate, and in order to prevent the first rivets which secure said tension member to the compression member from shearing off by reason of this angle or bend in the tension member the center plate is projected far enough backwardly or toward the center of the car to support the tension members beneath the first rivets and as far as the bend therein. The horizontal flanges of said tension members being placed on the bottom offer a very efficient supporting-face to rest upon the center plate. The center plate forms the point of support of the car-body on the truck, and consequently the entire strain on the underframe is transmitted by the construction described directly to the point of support. The tension-angles 4 project out beyond the body-bolster to the splice, thus stiffening the center sills entirely out to said splice, so that if there is any yielding between the end sill and the body-bolster it must be in the draft-sills, and as the latter are short pieces they can easily be replaced in case of injury.

The side sills are not intended to carry any load, and consequently can be made very light. They have been shown as small Z-bars 16 and are connected to the ends of the body-bolsters by means of sections of angle-bar 17 and 18. They serve as a convenient means for supporting the outside wooden nailing strips or stringers 19. Inasmuch as these sills do not carry any appreciable amount of the load provision is made for transmitting the load from the side sills to the deep center sills, and to this end the side and center sills are connected at intervals intermediate the body-bolsters by means of strong transoms or cross-bearers. Two such cross-bearers are shown, each being of a trussed type and comprising connecting members 20, preferably of angle-bar, secured to the center sills by means of angle or knee pieces 21 and extending out to the side sills, these members being placed in line with the struts 5 of the center sills. The cross members 20 are united transversely of the car by means of plates 24, lying above the center sills and riveted to the upper flanges of said cross members. The members 20 and plates 24 form the tension member of the trussed cross-bearers. The compression member of these cross-bearers is formed by means of two angle-bars 22, placed back to back, passing underneath the center sills and secured to the tension member thereof and thence being bent upwardly and having their ends secured to the gusset-plate 23, which serves to unite the cross members 20 to the side sills.

At intervals intermediate the body-bolsters and the trussed cross-bearers the side sills are connected to the center sills by cross connecting-ties 25, these comprising plates flanged on their top and bottom edges and inner ends, the latter serving as a means for connection to the center sills. At their outer ends they are connected to the side sills by angle-pieces 26 and 27. Between the center sills in line with these cross connecting-ties are the braces 28, which are formed by pressing a plate so as to form flanges on two sides thereof to serve as means for connecting the same to the center sills. These plates are also provided with horizontal transverse embossments or corrugations 29 in order to stiffen the same. Extending across the center sills above the same is a plate 30, whose ends are riveted to the top flanges of the cross-ties 25, and extending underneath the center sills and riveted to the lower flanges of said cross-ties is a similar plate 31. These cross-ties, it will be observed in Fig. 4, have their lower edges pressed or bulged sharply upwardly, this being for the purpose of giving clearance for the wheels. The cross-connectors, which are not in line with the wheels, however, have their lower edges straight and sloping upwardly from the center sills to the ends of said cross-connectors.

The end sill is a pressed plate 35 of channel shape, being of greater depth at its center than at its ends, as indicated at Fig. 4, and also having its central portion curving outwardly, as shown in Fig. 1. This sill is strengthened by means of the angle-bar 36, riveted to the upper flange thereof, with its vertical flange projecting upwardly and serving as a restraining means for the end plank of a flat-car or nailing-strip 37 of a box or similar car. The outer ends of the draft-sills are suitably secured to the end sill, and the latter is notched at its central portion, as at 38, to provide an opening for the shank of the draw-bar. At the corners of the car the vertical webs of the side sills are notched, as at 38ª, in order to receive the top flange of the end sill and the horizontal flange of the angle-bar 36. Placed in the end sill underneath the side sill is a casting 39. This casting is provided with vertical portions 40 and 41 at nearly right angles to each other and with a horizontal web 42, which lies underneath the lower flange of the Z-bar side sill. The upper flange of the end sill and the horizontal flange of the angle-bar 36 rest directly upon the horizontal flange of the casting. A single rivet or number of rivets 44 are used to unite these parts together, this rivet or rivets also serving to secure the outer end of a diagonal brace 45, whose horizontal flange bears against the under face of the horizontal web 42 of the casting. The inner end of this brace is suitably secured to a connection-plate 46, riveted to the center sills and top cover-plate of the body-bolster. The casting 39 is also provided with a vertical web 43, projecting downwardly from the horizontal web 42, said vertical web being on an incline, as shown, and the vertical flange of the diagonal brace secured thereto by means of the rivets 48. Outside of the wooden body portion is a corner-strap 50, secured to the wooden framework by suitable bolts and also secured to the casting 39 by means of rivets 51. The push-pole pocket 52 is secured to this corner-strap by means of rivets 53. The corner-casting described serves to rigidly unite the end and side sills, end-sill angle, and diagonal brace.

The underframe as a whole, it will be observed, has the greater part of the material at the central longitudinal line of the car, thus enabling it to effectually withstand end shocks. The load is carried entirely by the center sills, being transmitted from the car sides to the center sills by means of the strong cross-bearers and diaphragms, and this load is transmitted to the center plates in a very efficient manner.

What I claim is—

1. A car-underframe comprising body-bolsters, trussed center sills comprising a compression member formed of a channel-beam, a tension member formed of a flanged bar terminating in proximity to the body-bolsters, said tension member having its ends secured to the compression member and being separated therefrom intermediate its ends by struts, shallow side sills of uniform depth, and trussed cross-bearers connecting said center sills and side sills.

2. A longitudinal trussed sill for railway-cars comprising a compression member formed of a channel-beam, a tension member formed of a flanged bar terminating in proximity to the body-bolsters and having a flange on its lower edge, said tension member having its ends riveted to the compression member and being deflected from said compression member intermediate its ends, and a strut or struts interposed between said tension and compression members.

3. An underframe for railway-cars comprising body-bolsters, a trussed center sill comprising a compression member formed of a channel-beam, a tension member formed as an angle-bar terminating in proximity to the body-bolsters, said angle-bar having its vertical flange riveted at its ends to the compression member and having its horizontal flange on its lower edge and lying in approximately the same plane as the compression member, a strut or struts interposed between said tension and compression members, side sills of uniform depth, and trussed cross-bearers connecting said center sill and side sills.

4. An underframe for railway-cars comprising body-bolsters, a center sill formed as a flanged beam and projecting beyond said body-bolster, a reinforced truss member for said sill comprising a flanged bar having a flange on its lower edge and secured at its ends to the center sill, and a center plate secured to the body-bolster and serving as a support for the lower flange of the center sill and the lower flange of the reinforcing member.

5. An underframe for railway-cars comprising a body-bolster, a trussed center sill comprising a compression member formed of a flanged beam, a tension member formed as a flanged bar having its flange on its lower edge and having its middle portion separated from the compression member, a strut or struts between said tension and compression members, the ends of said tension member being directed upwardly and bent to a horizontal line, said horizontal portion being riveted to the compression member, and a center plate secured to the body-bolster and supporting the same out to the bend therein.

6. An underframe for railway-cars comprising end sills, body-bolsters, center sills projecting beyond the body-bolsters, draft-sills spliced to the center sills and extending out to the end sills, reinforcing truss members formed of flanged bars having their central portions separated from the center sill, and struts between said reinforcing members and center sills, said reinforcing members having their ends bent upwardly and riveted to the center sills and projecting out to the point where the draft-sills are connected to the center sills.

7. An underframe for railway-cars comprising longitudinal sills and transverse braces between said sills, said braces comprising plates flanged at their ends for riveting to the sills and having transverse horizontal embossments or corrugations formed therein.

8. An underframe for railway-cars comprising longitudinal sills, transverse braces between said sills comprising plates flanged on their side edges, and being provided with transverse horizontal embossments or corrugations, and cross-ties in line with said braces and connecting the center sills and car sides.

9. An underframe for railway-cars comprising center and side sills, cross-connectors between the center and side sills, transverse braces between the center sills in line with said cross-connectors, said transverse braces comprising plates suitably secured to the center sills and being provided with transverse horizontal embossments or corrugations, and cross connecting-plates extending over the center sills and secured to the cross-connectors.

10. In an underframe for railway-cars, the combination of side sills and ends sills provided with horizontal flanges, a corner-casting provided with an end face for bearing against the end sill and being provided with a horizontal web, and rivets or the like passing through said web and the horizontal flanges of the side and end sills.

11. In an underframe for railway-cars, the combination of the side and end sills provided with horizontal flanges, and corner-casting provided with a horizontal web bearing against the horizontal flanges of such side and end sills and having a diagonal depending web, a diagonal brace bearing against the lower face of the horizontal web of the casting and having a depending portion bearing against the depending web of said casting, and rivets or the like for securing the vertical flange of the diagonal brace to the depending web of the casting and for securing the horizontal flange of the diagonal brace and the horizontal flanges of the side and end sills to the horizontal web of the casting.

12. An underframe for railway-cars comprising side sills of flanged bars having their webs notched at the end, an end sill of channel shape having its upper flange projecting into the notch of the side sill, a strengthening-angle riveted to the top flange of said end sill with its horizontal flange below and projecting inwardly and into the notch in the end of the side sill, a corner-casting provided with a horizontal web, and rivets or the like passing through said horizontal web, the horizontal flange of the side sill, the top flange of the end sill, and the horizontal flange of the strengthening-angle.

13. An underframe for railway-cars comprising a side sill formed as a flanged bar provided with a notch in its end, an end sill having a flange projecting into said notch, a reinforcing-angle riveted to the end sill with its horizontal flange on its lower edge and projecting inwardly into the notch of the side sill, a corner-casting having a horizontal web with its upper face bearing against the lower flange of the side sill and having a diagonal depending web, a diagonal brace of angle shape having its horizontal flange on top and bearing against the lower face of the horizontal web of the casting and having its vertical flange bearing against the depending web of the casting, rivets or the like passing through said vertical web and the vertical flange of the brace, and rivets or the like passing through the horizontal flange of the diagonal brace, the horizontal web of the casting, and the flanges of the side and end sills and the horizontal flange of the strengthening-angle.

In testimony whereof I, the said ARNOLD STUCKI, have hereunto set my hand.

ARNOLD STUCKI.

Witnesses:
ROBERT C. TOTTEN,
J. R. KELLER.